United States Patent
Yoon et al.

(10) Patent No.: US 11,064,858 B2
(45) Date of Patent: Jul. 20, 2021

(54) ROBOT CLEANER AND CONTROL METHOD THEREOF

(71) Applicant: Samsung Electronics Co., Ltd., Suwon-si (KR)

(72) Inventors: Sang Sik Yoon, Suwon-si (KR); Jae Yun So, Suwon-si (KR); Sung Wook Kang, Suwon-si (KR); Bong-Gyo Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 16/185,469

(22) Filed: Nov. 9, 2018

(65) Prior Publication Data
US 2019/0142234 A1    May 16, 2019

(30) Foreign Application Priority Data

Nov. 10, 2017   (KR) .................. 10-2017-0149575

(51) Int. Cl.
*A47L 9/28*     (2006.01)
*B60B 19/00*    (2006.01)
(Continued)

(52) U.S. Cl.
CPC ............ *A47L 9/2852* (2013.01); *A47L 9/009* (2013.01); *A47L 9/0477* (2013.01);
(Continued)

(58) Field of Classification Search
CPC ...... A47L 9/2852; A47L 9/009; A47L 9/0477; A47L 9/0494; A47L 9/2826;
(Continued)

(56) References Cited

U.S. PATENT DOCUMENTS

2004/0199301 A1* 10/2004 Woo ............... G05D 1/0225
                                                    701/1
2006/0010638 A1*  1/2006 Shimizu ............. A47L 9/009
                                                    15/319
(Continued)

FOREIGN PATENT DOCUMENTS

CN     1517188 A    8/2004
EP     1441271      7/2004
(Continued)

OTHER PUBLICATIONS

International Search Report dated Mar. 8, 2019 in International Patent Application No. PCT/KR2018/013659.
(Continued)

*Primary Examiner* — Tyler J Lee
*Assistant Examiner* — Yufeng Zhang
(74) *Attorney, Agent, or Firm* — Staas & Halsey LLP

(57) ABSTRACT

A robot cleaner and a traveling algorithm of the robot cleaner having wheels capable of moving in all directions to have enhanced traveling ability in various directions includes a body unit, a sensor provided to be rotatable with respect to the body unit to sense obstacles, a multi-directional moving wheel provided at a lower portion of the body unit to move the body unit in various directions, and a controller configured to determine a traveling route of the robot cleaner to avoid the detected obstacles and control the multi-directional moving wheel when the traveling route is
(Continued)

determined so that the robot cleaner moves to the determined traveling route in a state where the body unit is not rotated.

15 Claims, 14 Drawing Sheets

(51) Int. Cl.
  *A47L 9/04* (2006.01)
  *G05D 1/02* (2020.01)
  *A47L 9/00* (2006.01)

(52) U.S. Cl.
  CPC .......... *A47L 9/0494* (2013.01); *A47L 9/2826* (2013.01); *A47L 9/2847* (2013.01); *G05D 1/0214* (2013.01); *G05D 1/0225* (2013.01); *A47L 9/2873* (2013.01); *A47L 2201/022* (2013.01); *A47L 2201/04* (2013.01); *A47L 2201/06* (2013.01); *B60B 19/003* (2013.01); *G05D 2201/0203* (2013.01); *G05D 2201/0215* (2013.01)

(58) Field of Classification Search
  CPC ................. A47L 9/2847; A47L 9/2873; A47L 2201/022; A47L 2201/04; A47L 2201/06; G05D 1/0214; G05D 1/0225; G05D 2201/0203; G05D 2201/0215; B60B 19/003
  See application file for complete search history.

(56) References Cited

U.S. PATENT DOCUMENTS

| | | | |
|---|---|---|---|
| 2007/0272463 | A1 | 11/2007 | Yu et al. |
| 2009/0314318 | A1 | 12/2009 | Chang |
| 2013/0226344 | A1 | 8/2013 | Wong et al. |
| 2016/0091899 | A1* | 3/2016 | Aldred .................. B60L 53/14 701/23 |
| 2017/0297455 | A1* | 10/2017 | Romanov ............... B60L 50/66 |

FOREIGN PATENT DOCUMENTS

| | | |
|---|---|---|
| KR | 10-2009-0067745 | 6/2009 |
| KR | 10-2013-0002218 | 1/2013 |
| KR | 10-2013-0050482 | 5/2013 |
| KR | 20130050482 A * | 5/2013 |
| KR | 10-2014-0115891 | 10/2014 |
| KR | 10-2015-0057959 | 5/2015 |

OTHER PUBLICATIONS

Extended European Search Report dated Jul. 22, 2020 in European Patent Application No. 18876216.5.
Chinese Office Action dated Apr. 2, 2021 in corresponding Application 201880072424.5.
European Office Action dated Feb. 25, 2021 in corresponding Application 18 876 216.5-1202.

* cited by examiner

ROBOT CLEANER AND CONTROL METHOD THEREOF

CROSS-REFERENCE TO RELATED APPLICATIONS

This application is based on and claims priority under 35 U.S.C. § 119 to Korean Patent Application No. 10-2017-0149575, filed on Nov. 10, 2017 in the Korean Intellectual Property Office, the disclosure of which is incorporated by reference herein in its entirety.

BACKGROUND

1. Field

The disclosure relates to a robot cleaner and a control method thereof, and more particularly, to a robot cleaner and a traveling algorithm of the robot cleaner having wheels capable of moving in all directions to have enhanced traveling ability in various directions.

2. Description of Related Art

A robot cleaner is a device for automatically cleaning a cleaning space by suctioning foreign substances such as dust accumulated on a floor while traveling in the cleaning space without being operated by a user. That is, the robot cleaner cleans a cleaning space while traveling in the cleaning space.

The robot cleaner generally performs the cleaning automatically according to its own planned route regardless of the intention of the user. The robot cleaner generates a route for avoiding obstacles when it detects the obstacles while it travels in a cleaning space and travels in the cleaning space while avoiding the obstacles.

In order to avoid obstacles, the robot cleaner repeats an operation for avoiding the obstacles according to a predetermined traveling pattern, thereby delaying the cleaning time or increasing the battery consumption of the robot cleaner. In addition, if the space in which the robot cleaner travels is narrow, restraint may occur in the traveling of the robot cleaner, and the robot cleaner may become isolated without being able to escape from a narrow area.

Accordingly, in recent years, there has been a growing need for a robot cleaner capable of effectively avoiding obstacles located in a traveling cleaning space and performing efficient cleaning by controlling the robot cleaner to freely travel in various directions.

SUMMARY

It is an aspect of the present disclosure to provide a robot cleaner and a control method thereof capable of effectively avoiding obstacles and effectively escaping narrow areas by having wheels capable of moving in all directions to move in various directions without rotating a body of the robot cleaner.

Additional aspects will be set forth in part in the description which follows and, in part, will be apparent from the description, or may be learned by practice of the presented embodiments.

In accordance with an aspect of the present disclosure, a robot cleaner may include a body unit, a sensor provided to be rotatable with respect to the body unit to sense obstacles, a multi-directional moving wheel provided at a lower portion of the body unit to move the body unit in various directions, and a controller configured to determine a traveling route of the robot cleaner to avoid the detected obstacles and control the multi-directional moving wheel when the traveling route is determined so that the robot cleaner moves to the determined traveling route in a state where the body unit is not rotated.

The robot cleaner may further include a sensor rotation module rotatably coupled to the body unit, wherein the sensor may be provided in the sensor rotation module.

The sensor may rotate in a direction of avoiding the sensed obstacles, and the controller may determine a traveling route of the robot cleaner to avoid the obstacles based on the rotational direction of the sensor.

The controller may determine a traveling route for avoiding the obstacles in a state where the body unit of the robot cleaner is not rotated based on position information of the sensed obstacles.

The sensor may sense a target object to which the robot cleaner is to travel and reach, and the target object may include a wall which the robot cleaner follows to perform the cleaning, and a docking station for charging a battery of the robot cleaner.

The sensor may rotate in a direction in which the robot cleaner travels to reach the sensed target object, and the controller may determine a traveling route of the robot cleaner so that the robot cleaner reaches the sensed target object based on the rotational direction of the sensor.

The controller may control, when the traveling route is determined, the multi-directional moving wheel so that the robot cleaner moves to the determined traveling route to reach the sensed target object in a state where the body unit is not rotated.

The robot cleaner may further include a brush unit coupled to the body unit to suck foreign matter, wherein the sensor may sense an angle of one surface of the sensed target object based on one surface of the brush unit.

The controller may control the multi-directional moving wheel to rotate the body unit so that the one surface of the brush unit is positioned in a direction parallel to the one surface of the sensed target object based on the angle of the one surface of the sensed target object.

The controller may control, when the body unit is rotated and the one surface of the brush unit is positioned in the direction parallel to the one surface of the sensed target object, the multi-directional moving wheel to move the robot cleaner along the determined traveling route, and the body unit may not be rotated while the robot cleaner moves along the determined traveling route.

The multi-directional moving wheel provided at the lower portion of the body unit may be capable of forward movement, rearward movement, leftward/rightward movement, diagonal movement, and rotation in place, thereby moving the body unit in multiple directions.

A plurality of the multi-directional moving wheels may be provided at the lower portion of the body unit, and the respective operations of the multi-directional moving wheels may be individually controlled by the controller.

In accordance with an aspect of the present disclosure, a control method of a robot cleaner may include sensing an obstacle, determining a traveling route of the robot cleaner to avoid the sensed obstacle, and controlling a multi-directional moving wheel of the robot cleaner when the traveling route is determined so that the robot cleaner moves to the determined traveling route in a state where a body unit of the robot cleaner is not rotated.

The control method may further include controlling a sensor of the robot cleaner to rotate in a direction of avoiding the sensed obstacle, wherein a traveling route of the robot cleaner may be determined to avoid the obstacle based on the rotational direction of the sensor.

The determining of the traveling route of the robot cleaner may include determining the traveling route to avoid the obstacle in a state where the body unit of the robot cleaner is not rotated, based on location information of the sensed obstacle.

The control method may further include sensing a target object to which the robot cleaner is to travel and reach, wherein the target object may include a wall which the robot cleaner follows to perform the cleaning, and a docking station for charging a battery of the robot cleaner.

The control method may further include controlling the sensor to rotate in a direction in which the robot cleaner travels to reach the sensed target object, wherein a traveling route of the robot cleaner may be determined so that the robot cleaner reaches the sensed target object based on the rotational direction of the sensor.

The controlling of the multi-directional moving wheel of the robot cleaner may include controlling, when the traveling route is determined, the multi-directional moving wheel so that the robot cleaner moves to the determined traveling route to reach the sensed target object in a state where the body unit is not rotated.

The control method may further include sensing an angle of one surface of the sensed target object based on one surface of a brush unit coupled to the body unit to suck foreign matter.

The controlling of the multi-directional moving wheel of the robot cleaner may include controlling the multi-directional moving wheel to rotate the body unit so that the one surface of the brush unit is positioned in a direction parallel to the one surface of the sensed target object based on the angle of the one surface of the sensed target object.

The controlling of the multi-directional moving wheel of the robot cleaner may further include controlling, when the body unit is rotated and the one surface of the brush unit is positioned in the direction parallel to the one surface of the sensed target object, the multi-directional moving wheel to move the robot cleaner along the determined traveling route, wherein the body unit may not be rotated while the robot cleaner moves along the determined traveling route.

BRIEF DESCRIPTION OF THE DRAWINGS

The above and other aspects, features, and advantages of particular embodiments of the present disclosure will be more apparent from the following description taken in conjunction with the accompanying drawings, in which.

DETAILED DESCRIPTION

Figure 1:
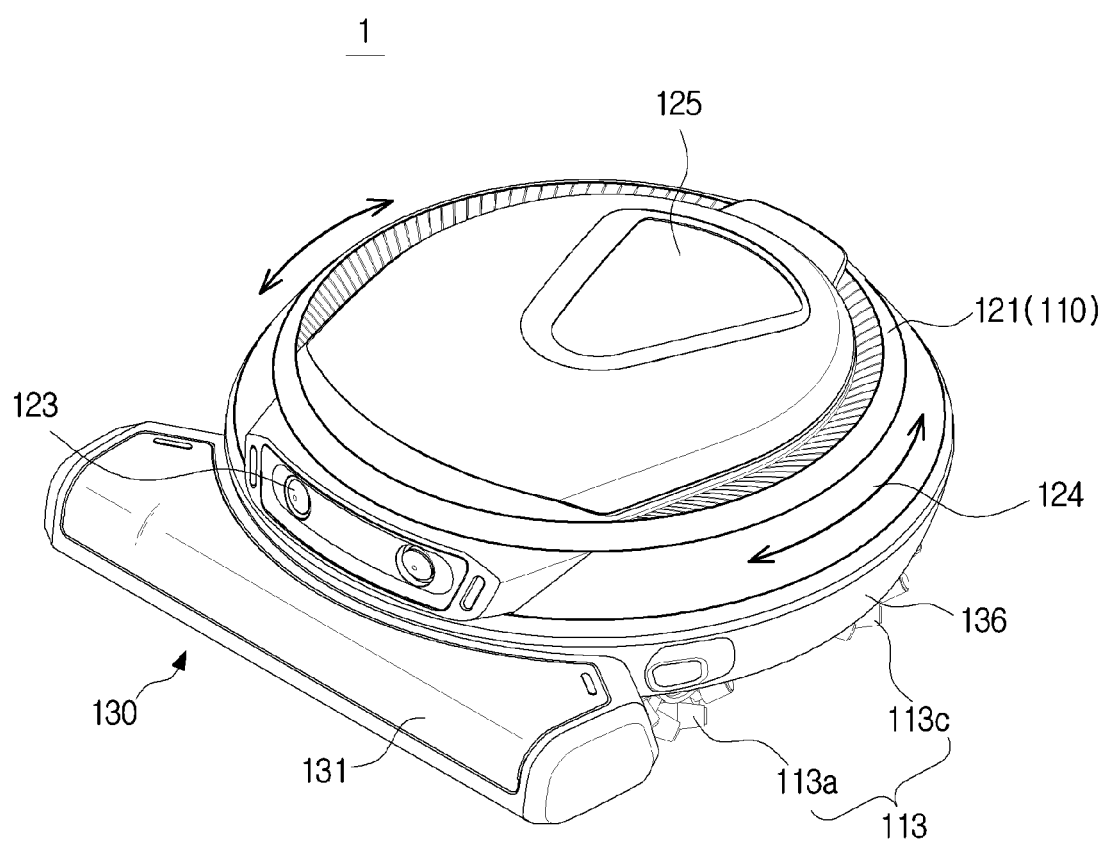
FIG. 1 is a perspective view of a robot cleaner according to an embodiment of the present disclosure.

The embodiments described herein and the configurations shown in the drawings are only examples of embodiments of the present disclosure, and various modifications may be made at the time of filing of the present disclosure to replace the embodiments and drawings of the present specification.

Like reference numbers or symbols in the various figures of the present application represent elements or components that perform substantially the same function.

The terms used herein are for the purpose of describing the embodiments and are not intended to restrict and/or to limit the disclosure. For example, the singular expressions herein may include plural expressions, unless the context clearly dictates otherwise. Also, the terms "comprises" or "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the present invention, the first component may be referred to as a second component, and similarly, the second component may also be referred to as a first component. The term "and/or" includes any combination of a plurality of related items or any of a plurality of related items.

In this specification, the terms "front," "rear," "upper," "lower," "left," and "right" are defined with reference to the drawings, and the shape and position of each component are not limited by these terms.

Hereinafter, embodiments according to the present disclosure will be described in detail with reference to the accompanying drawings.

The terms "front" and "forward" as used below refer to a front and a forward direction based on the robot cleaner shown in FIG. 1, and the term "rearward" refers to a rearward direction of the robot cleaner.

Figure 2:
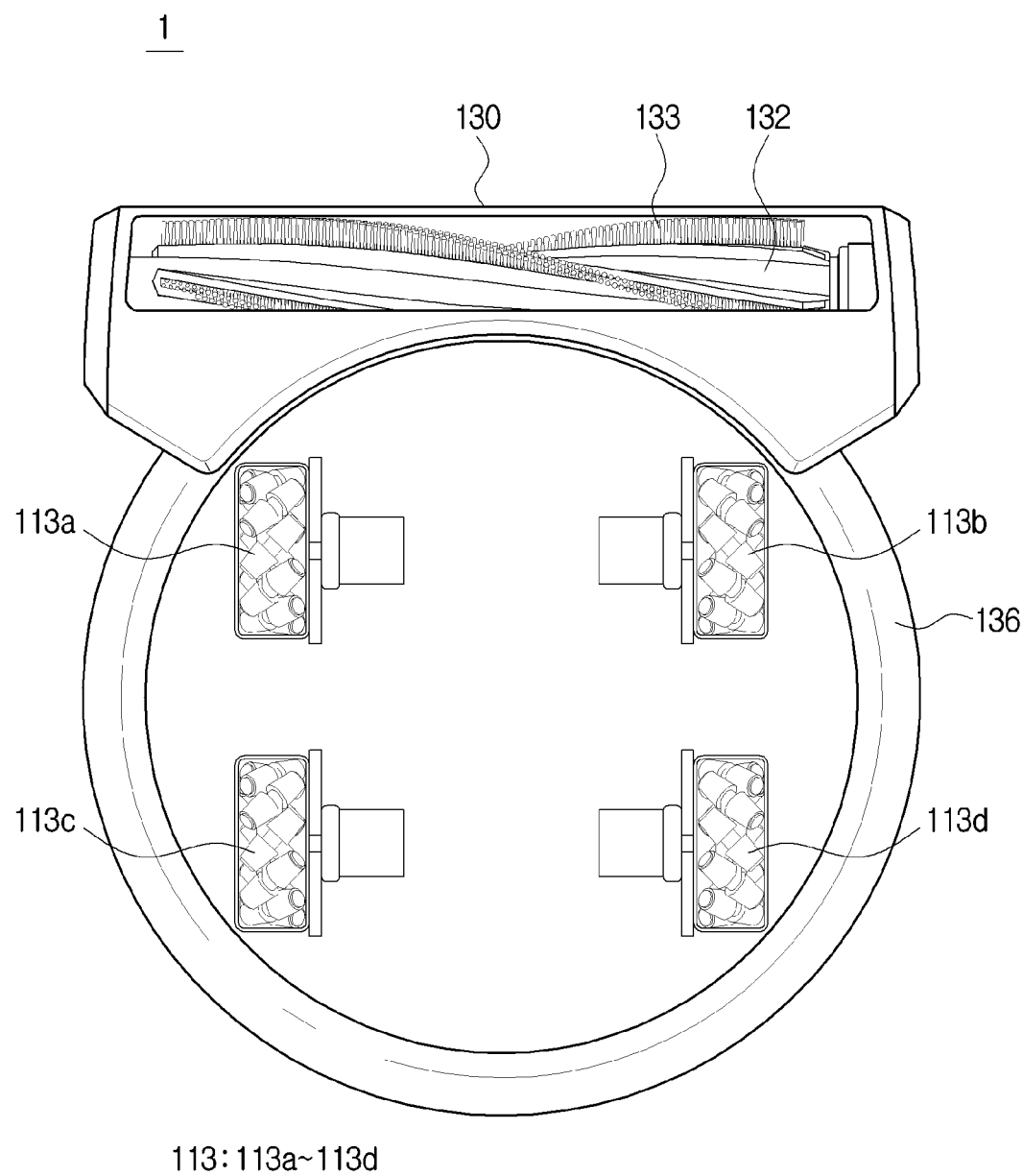
FIG. 2 is a bottom view illustrating a bottom surface of a robot cleaner according to an embodiment of the present disclosure.
Figure 3:
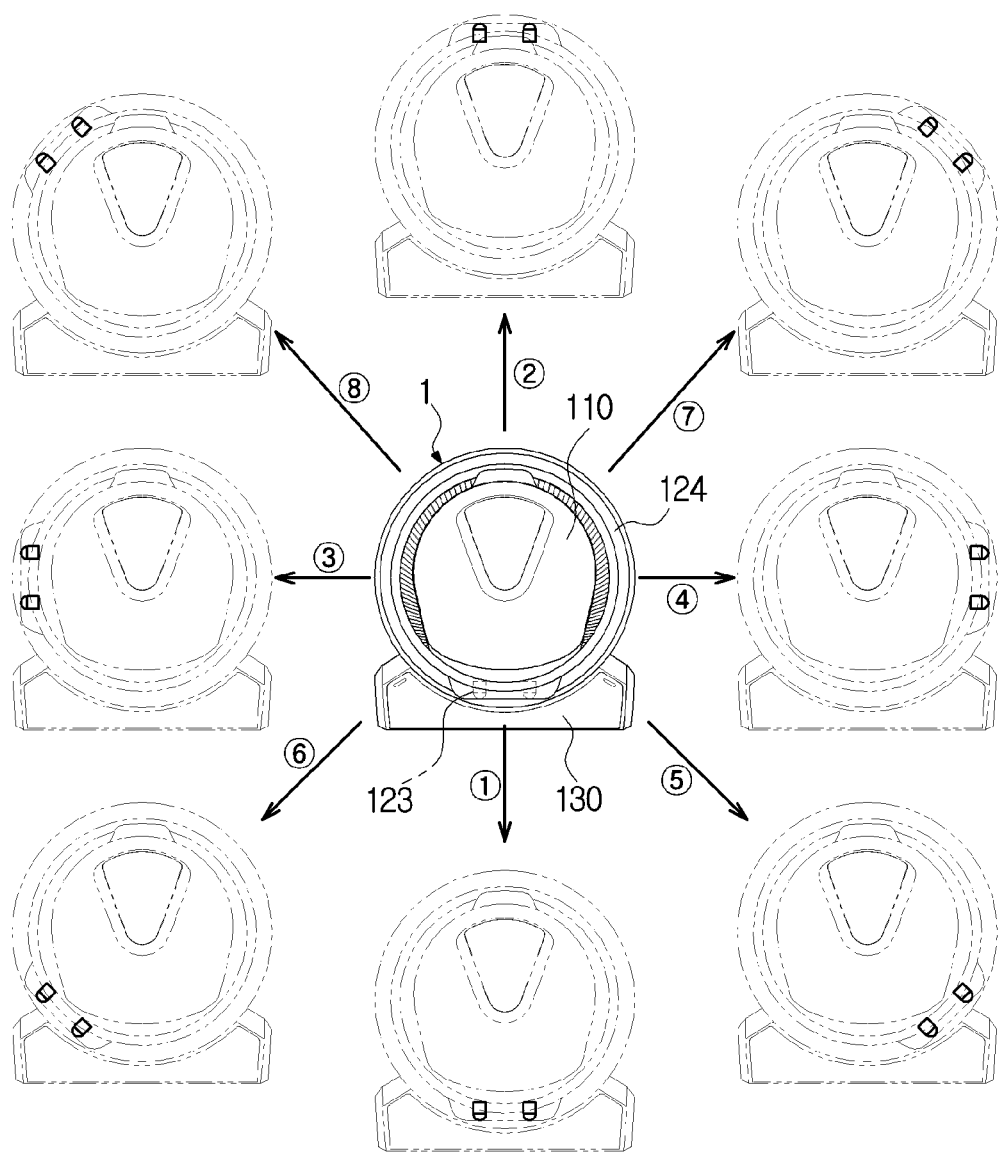
FIG. 3 is a view illustrating traveling forms of a robot cleaner according to an embodiment of the present disclosure.
Figure 4:
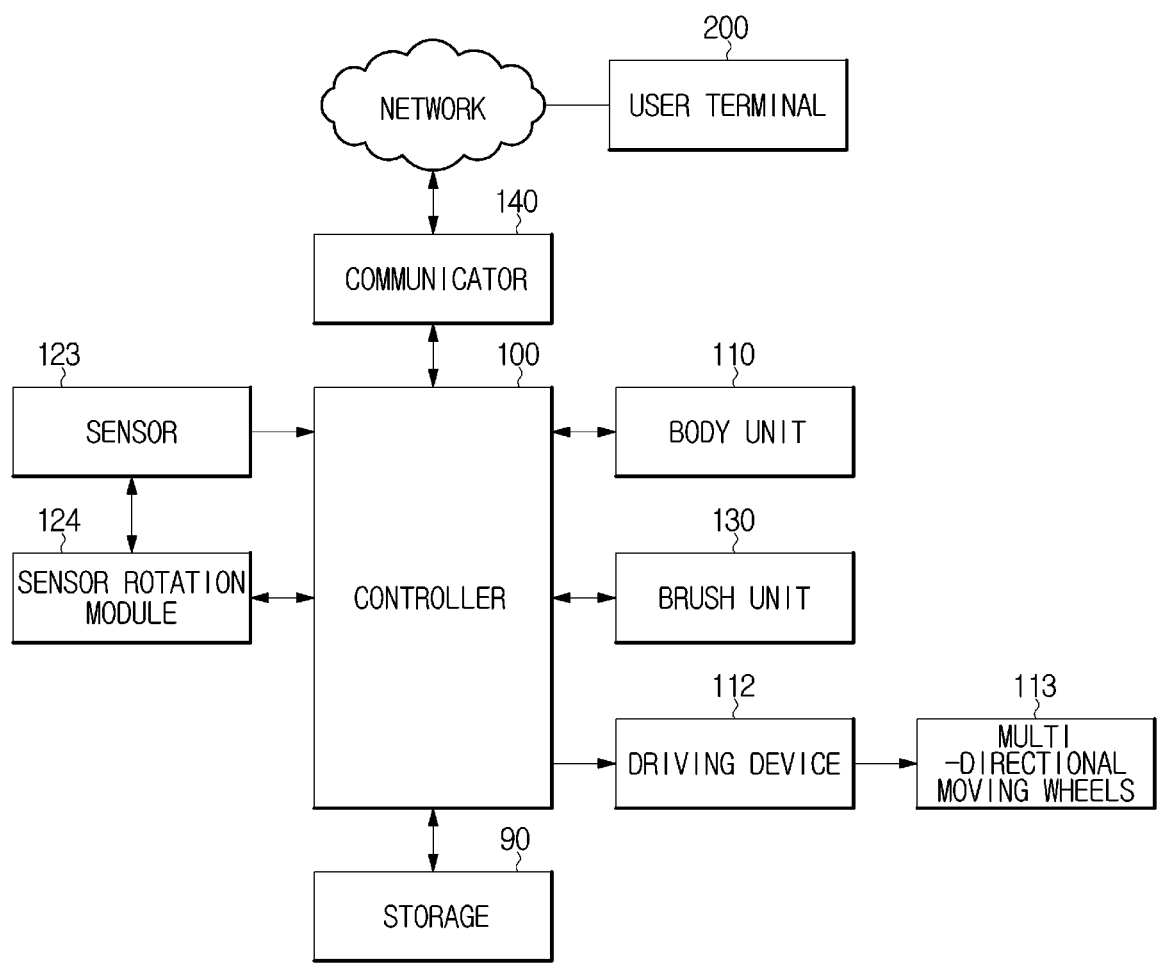
FIG. 4 is a control block diagram of a robot cleaner according to an embodiment of the present disclosure.

FIG. 1 is a perspective view of a robot cleaner according to an embodiment of the present disclosure, FIG. 2 is a bottom view illustrating a bottom surface of a robot cleaner according to an embodiment of the present disclosure, FIG. 3 is a view illustrating traveling forms of a robot cleaner according to an embodiment of the present disclosure, and FIG. 4 is a control block diagram of a robot cleaner according to an embodiment of the present disclosure.

Referring to FIGS. 1 and 2, a robot cleaner 1 according to an embodiment of the present disclosure will be described.

The robot cleaner 1 may include a body unit 110 and a brush unit 130.

The body unit 110 may include a driving device 112, a main body for accommodating a dust collecting device therein, and a cover 121 for covering an upper surface of the main body. The body unit 110 may be coupled with the brush unit 130 to rotate or move in the same direction.

The main body may have a space therein for accommodating the dust collecting device. The main body may include a dust collecting passage for guiding air containing foreign matter such as dust sucked from the brush unit 130 to the dust collecting device. The main body may also include a flow passage partitioning portion for forming the dust collecting passage.

The driving device 112 may include multi-directional moving wheels 113 to move the main body in a cleaning area. The driving device 112 may include a driving source (not shown) for rotationally driving the multi-directional moving wheels 113.

The multi-directional moving wheels 113 may be arranged to protrude downward from a bottom surface of the main body. The multi-directional moving wheels 113 may be provided on the left and right sides of the bottom surface of the main body, respectively.

As shown in FIG. 2, a plurality of the multi-directional moving wheels 113 may be provided on the bottom surface of the main body. Although the robot cleaner 1 according to an embodiment of the present disclosure has four multi-directional moving wheels 113a, 113b, 113c, and 113d for the sake of illustration, there is no restriction on the number and location of the multi-directional moving wheels 113, and various embodiments may be presented.

The driving device 112 may include electric motors connected to the plurality of multi-directional moving wheels 113 to generate a rotational driving force, and power transmitting members for transmitting the rotational driving force of the electric motors to the multi-directional moving wheels 113. The driving device 112 may be connected to the plurality of multi-directional moving wheels 113 to drive the multi-directional moving wheels 113 individually, and the driving of the driving device 112 may be controlled by a controller 100.

The controller 100 may individually control the operation states such as the operation, stop, rotation direction, and the like of the driving device 112, and the multi-directional moving wheels 113 may be diverted in various directions according to the operation, stop, and rotation direction of the driving device 112, so that the robot cleaner 1 may effectively avoid obstacles and increase the degree of freedom of movement.

The multi-directional moving wheels 113 are provided at a lower portion of the body unit 110, and may be capable of forward movement, rearward movement, leftward/rightward movement, diagonal movement, and rotation in place, thereby moving the body unit 110 in multiple directions.

The dust collecting device may be accommodated inside the main body. The dust collecting device may include a suction motor providing power for sucking dust, and a dust collecting container for storing the sucked dust. The air containing foreign matter sucked in from the brush unit 130 may be introduced into the dust collecting device through a suction passage.

The cover 121 may cover the upper surface of the main body. Specifically, the cover 121 may cover the upper surface of the main body coupled with the brush unit 130. That is, the cover 121 may be coupled to an upper portion of the brush unit 130 to cover the upper surface of the main body.

The cover 121 may include a sensor 123 for sensing obstacles. The sensor 123 may be arranged to sense in a forward direction along the traveling direction of the driving device 112. The sensor 123 is provided to be rotatable with respect to the body unit 110 of the robot cleaner 1 and may sense obstacles located on or around a traveling route of the robot cleaner 1 from the front or side of the robot cleaner 1.

The position where the sensor 123 is provided is merely an example, and there is no limitation on the position where the sensor 123 is provided or the number of the sensors 123.

The cover 121 may include a sensor rotation module 124 that is rotatably coupled with respect to the body unit 110. The sensor rotation module 124 may be provided in a circular shape at an upper portion of the body unit 110 and may rotate clockwise or counterclockwise under the control of the controller 100.

The sensor 123 may be provided in the sensor rotation module 124, and may rotate clockwise or counterclockwise with respect to the body unit 110 in accordance with the rotation of the sensor rotation module 124.

The sensor 123 may sense obstacles on the traveling route of the robot cleaner 1. When an obstacle is sensed, the sensor 123 may rotate in a direction of avoiding the obstacle and may search the traveling route of the robot cleaner 1. In addition, the sensor 123 may sense a target object for the robot cleaner 1 to travel toward, and may rotate in a direction of heading toward the sensed target object and may search the traveling route of the robot cleaner 1.

That is, the sensor 123 may first rotate in the direction to travel before the robot cleaner 1 determines the traveling route and starts traveling, thereby searching the traveling route of the robot cleaner 1 for obstacles.

Various types of the sensors 123 may be used, such as a motion sensor, an image sensor, an infrared sensor, a radio wave sensor, and a three-dimensional sensing sensor. The sensor 123 may sense a predetermined distance to an obstacle located on the traveling route of the robot cleaner 1 and recognize the existence of the obstacle. The motion sensor may recognizes the motion of a moving obstacle and obtain a three-dimensional shape of the obstacle, and the image sensor may also obtain a shape of an obstacle. The infrared sensor or the radio wave sensor may measure the distance to an obstacle by transmitting an infrared ray or a radio wave to an object, and when a plurality of the sensors 123 are provided, not only one-dimensional distance, but also shapes and positions of two-dimensional and three-dimensional obstacles may be sensed. The three-dimensional sensing sensor may also recognize the distance to an obstacle and a three-dimensional shape of the obstacle. Because two-dimensional and three-dimensional shapes may be sensed when the plurality of sensors 123 capable of recognizing the distance and shape on a one-dimensional plane are provided, two- or three-dimensional obstacles may also be sensed depending on the type and number of the sensors 123. The robot cleaner 1 may move in the traveling route by sensing the traveling route through the sensor 123 and avoiding obstacles.

The cover 121 may include a dust checker 125 provided to check the dust collected inside the dust collecting device. The dust checker 125 may be formed to be transparent so that the inside of the dust collecting device may be seen without opening the cover 121.

The brush unit 130 may include a brush part 131 for sucking dust from the bottom surface and a base part 136 coupled to a lower portion of the body unit 110.

The brush part 131 may include a roller 132 rotatably mounted in the brush part 131 and a brush 133 provided on an outer circumferential surface of the roller 132. As the roller 132 rotates, the brush 133 may sweep foreign matter from the bottom surface into a suction passage 131a.

The base part 136 may form a lower portion of the outer surface of the robot cleaner 1. The base part 136 may be formed in a substantially circular shape having a space into which the main body may be inserted. That is, the base part 136 may have a donut shape.

The base part 136 may include a second passage forming portion forming a connection passage together with a first passage forming portion. The second passage forming portion may extend along an inner circumferential surface of the base part 136.

That is, the connection passage is formed between the inner circumferential surface of the brush unit 130 and the outer circumferential surface of the body unit 110 to connect the suction passage and the dust collecting passage, and may extend along a circumferential direction of the body unit 110.

Hereinafter, wheel motions of the multi-directional moving wheels 113 of the robot cleaner 1 according to an embodiment and traveling modes in which the robot cleaner 1 moves according to the wheel motions will be described with reference to FIG. 3.

As shown in FIG. 2, when the robot cleaner 1 is provided with the four multi-directional moving wheels 113, the multi-directional moving wheels 113 may include the front right multi-directional moving wheel 113a, the front left multi-directional moving wheel 113b, the rear right multi-directional moving wheel 113c and the rear left multi-directional moving wheel 113d.

When the moving direction of the robot cleaner 1 is a forward straight direction as indicated by (1) in FIG. 3, the driving device 112 drives all of the four multi-directional moving wheels 113 in the forward direction in accordance with the control of the controller 100. As the driving device 112 drives as above, the direction of the force of the front right multi-directional moving wheel 113a and the direction of the force of the front left multi-directional moving wheel 113b face inward at 45°, and the direction of the force of the rear right multi-directional moving wheel 113c and the direction of the force of the rear left multi-directional moving wheel 113d face outward at 45°, so that the traveling of the robot cleaner 1 in the forward straight direction may be performed by the combination of the directions of the forces as above.

In this case, the sensor 123 included in the sensor rotation module 124 may rotate in the forward direction with respect to the body unit 110 to search a traveling route in which the robot cleaner 1 moves straight in the forward direction and to sense obstacles located in the vicinity of the robot cleaner 1 while the robot cleaner 1 is moving in the forward direction.

When the moving direction of the robot cleaner 1 is a rearward straight direction as indicated by (2) in FIG. 3, the driving device 112 drives all of the four multi-directional moving wheels 113 in the rearward direction in accordance with the control of the controller 100. As the driving device 112 drives as above, the direction of the force of the front right multi-directional moving wheel 113a and the direction of the force of the front left multi-directional moving wheel 113b face outward at 45°, and the direction of the force of the rear right multi-directional moving wheel 113c and the direction of the force of the rear left multi-directional moving wheel 113d face inward at 45°, so that the traveling of the robot cleaner 1 in the rearward straight direction may be performed by the combination of the directions of the forces as above.

In this case, the sensor 123 included in the sensor rotation module 124 may rotate in the rearward direction with respect to the body unit 110 to search a traveling route in which the robot cleaner 1 moves straight in the rearward direction and to sense obstacles located in the vicinity of the robot cleaner 1 while the robot cleaner 1 is moving in the rearward direction.

When the moving direction of the robot cleaner 1 is a rightward straight direction as indicated by (3) in FIG. 3, the driving device 112 drives the front left multi-directional moving wheel 113b and the rear right multi-directional moving wheel 113c provided diagonally thereto in the forward direction and drives the front right multi-directional moving wheel 113a and the rear left multi-directional moving wheel 113d provided diagonally thereto in the rearward direction, in accordance with the control of the controller 100. As the driving device 112 drives as above, the direction of the force of the front right multi-directional moving wheel 113a and the direction of the force of the rear right multi-directional moving wheel 113c face inward at 45°, and the direction of the force of the front left multi-directional moving wheel 113b and the direction of the force of the rear left multi-directional moving wheel 113d face outward at 45°, so that the traveling of the robot cleaner 1 in the rightward straight direction may be performed by the combination of the directions of the forces as above.

In this case, the sensor 123 included in the sensor rotation module 124 may rotate in the rightward direction with respect to the body unit 110 to search a traveling route in which the robot cleaner 1 moves straight in the rightward direction and to sense obstacles located in the vicinity of the robot cleaner 1 while the robot cleaner 1 is moving in the rightward direction.

When the moving direction of the robot cleaner 1 is a leftward straight direction as indicated by (4) in FIG. 3, the driving device 112 drives the front left multi-directional moving wheel 113b and the rear right multi-directional moving wheel 113c provided diagonally thereto in the rearward direction and drives the front right multi-directional moving wheel 113a and the rear left multi-directional moving wheel 113d provided diagonally thereto in the forward direction, in accordance with the control of the controller 100. As the driving device 112 drives as above, the direction of the force of the front right multi-directional moving wheel 113a and the direction of the force of the rear right multi-directional moving wheel 113c face outward at 45°, and the direction of the force of the front left multi-directional moving wheel 113b and the direction of the force of the rear left multi-directional moving wheel 113d face inward at 45°, so that the traveling of the robot cleaner 1 in the leftward straight direction may be performed by the combination of the directions of the forces as above.

In this case, the sensor 123 included in the sensor rotation module 124 may rotate in the leftward direction with respect to the body unit 110 to search for a traveling route in which the robot cleaner 1 moves straight in the leftward direction and to sense obstacles located in the vicinity of the robot cleaner 1 while the robot cleaner 1 is moving in the leftward direction.

When the moving direction of the robot cleaner 1 is a forward left diagonal direction as indicated by (5) in FIG. 3, the driving device 112 does not drive the front left multi-directional moving wheel 113b and the rear right multi-directional moving wheel 113c provided diagonally thereto and drives the front right multi-directional moving wheel 113a and the rear left multi-directional moving wheel 113d provided diagonally thereto in the forward direction, in accordance with the control of the controller 100. According to the above driving, the robot cleaner 1 may travel straight in the forward left diagonal direction.

In this case, the sensor 123 included in the sensor rotation module 124 may rotate in the forward left diagonal direction with respect to the body unit 110 to search a traveling route in which the robot cleaner 1 moves straight in the forward left diagonal direction and to sense obstacles located in the vicinity of the robot cleaner 1 while the robot cleaner 1 is moving in the forward left diagonal direction.

When the moving direction of the robot cleaner 1 is a forward right diagonal direction as indicated by (6) in FIG. 3, the driving device 112 does not drive the front right multi-directional moving wheel 113a and the rear left multi-directional moving wheel 113d provided diagonally thereto and drives the front left multi-directional moving wheel 113b and the rear right multi-directional moving wheel 113c provided diagonally thereto in the forward direction, in accordance with the control of the controller 100. According to the above driving, the robot cleaner 1 may travel straight in the forward right diagonal direction.

In this case, the sensor 123 included in the sensor rotation module 124 may rotate in the forward right diagonal direction with respect to the body unit 110 to search a traveling route in which the robot cleaner 1 moves straight in the forward right diagonal direction and to sense obstacles located in the vicinity of the robot cleaner 1 while the robot cleaner 1 is moving in the forward right diagonal direction.

When the moving direction of the robot cleaner 1 is a rearward left diagonal direction as indicated by (7) in FIG. 3, the driving device 112 may not drive the front right multi-directional moving wheel 113a and the rear left multi-directional moving wheel 113d provided diagonally thereto and may drive the front left multi-directional moving wheel 113b and the rear right multi-directional moving wheel 113c provided diagonally thereto in the rearward direction, in accordance with the control of the controller 100. According to the above driving, the robot cleaner 1 may travel straight in the rearward left diagonal direction.

In this case, the sensor 123 included in the sensor rotation module 124 may rotate straight in the rearward left diagonal direction with respect to the body unit 110 to search a traveling route in which the robot cleaner 1 moves straight in the rearward left diagonal direction and to sense obstacles located in the vicinity of the robot cleaner 1 while the robot cleaner 1 is moving in the rearward left diagonal direction.

When the moving direction of the robot cleaner 1 is a rearward right diagonal direction as indicated by (8) in FIG. 3, the driving device 112 may not drive the front left multi-directional moving wheel 113b and the rear right multi-directional moving wheel 113c provided diagonally thereto and may drive the front right multi-directional moving wheel 113a and the rear left multi-directional moving wheel 113d provided diagonally thereto in the rearward direction, in accordance with the control of the controller 100. According to the above driving, the robot cleaner 1 may travel straight in the rearward right diagonal direction diagonal direction.

In this case, the sensor 123 included in the sensor rotation module 124 may rotate straight in the rearward right diagonal direction with respect to the body unit 110 to search a traveling route in which the robot cleaner 1 moves straight in the rearward right diagonal direction and to sense obstacles located in the vicinity of the robot cleaner 1 while the robot cleaner 1 is moving in the rearward right diagonal direction.

Referring to FIG. 4, the robot cleaner 1 according to an embodiment of the present disclosure may include a storage 90 for storing data related to the control of the robot cleaner 1, the controller 100 for controlling each configuration of the robot cleaner 1, and a communicator 140 for transmitting and receiving data through communication between the robot cleaner 1 and an external device such as a user terminal 200.

The storage 90 may store control programs and control data for controlling the robot cleaner 1, and map information of the cleaning space acquired while the robot cleaner 1 is traveling. The storage 90 may store data for movement limiting directions of the robot cleaner 1 sensed by the sensor 123 on the traveling route of the robot cleaner 1 or data for routes that the robot cleaner 1 moves while avoiding obstacles. The storage 90 may also store data on a traveling route determined in a direction in which the robot cleaner 1 travels to reach a target object sensed by the sensor 123.

When the sensor 123 is rotated by the sensor rotation module 124, the storage 90 may store data on the angle at which the sensor rotation module 124 rotates so that the robot cleaner 1 may travel while avoiding obstacles on the traveling route.

The storage 90 may operate as an auxiliary storage device for backing up a memory included in the controller 100, which will be described later, and may be configured as a nonvolatile storage medium in which the stored data is not erased if the robot cleaner 1 is powered off.

The storage 90 may include a semiconductor device drive that stores data in a semiconductor device, a magnetic disk drive that stores data on a magnetic disk, and the like.

The communicator 140, when the traveling route of the robot cleaner 1 may not be secured due to an obstacle located around the robot cleaner 1, may transmit the situation to an external device such as the user terminal 200. That is, the communicator 140 may transmit to the user terminal 200 the situation in which the traveling route of the robot cleaner 1 cannot be secured, so that the user may recognize the situation through a sound or a screen. The user terminal 200 receiving data from the robot cleaner 1 through the communicator 140 may include various wired and wireless communication devices such as a smart phone and a PDA.

The communicator 140 may include a Wi-Fi communication module, a USB communication module, and a Bluetooth communication module.

The controller 100 collectively controls the operation of the robot cleaner 1.

A control algorithm of the controller 100 for collectively controlling the operation of the robot cleaner 1 according to an embodiment of the present disclosure will be described below with reference to FIGS. 5 to 14.

Figure 5:
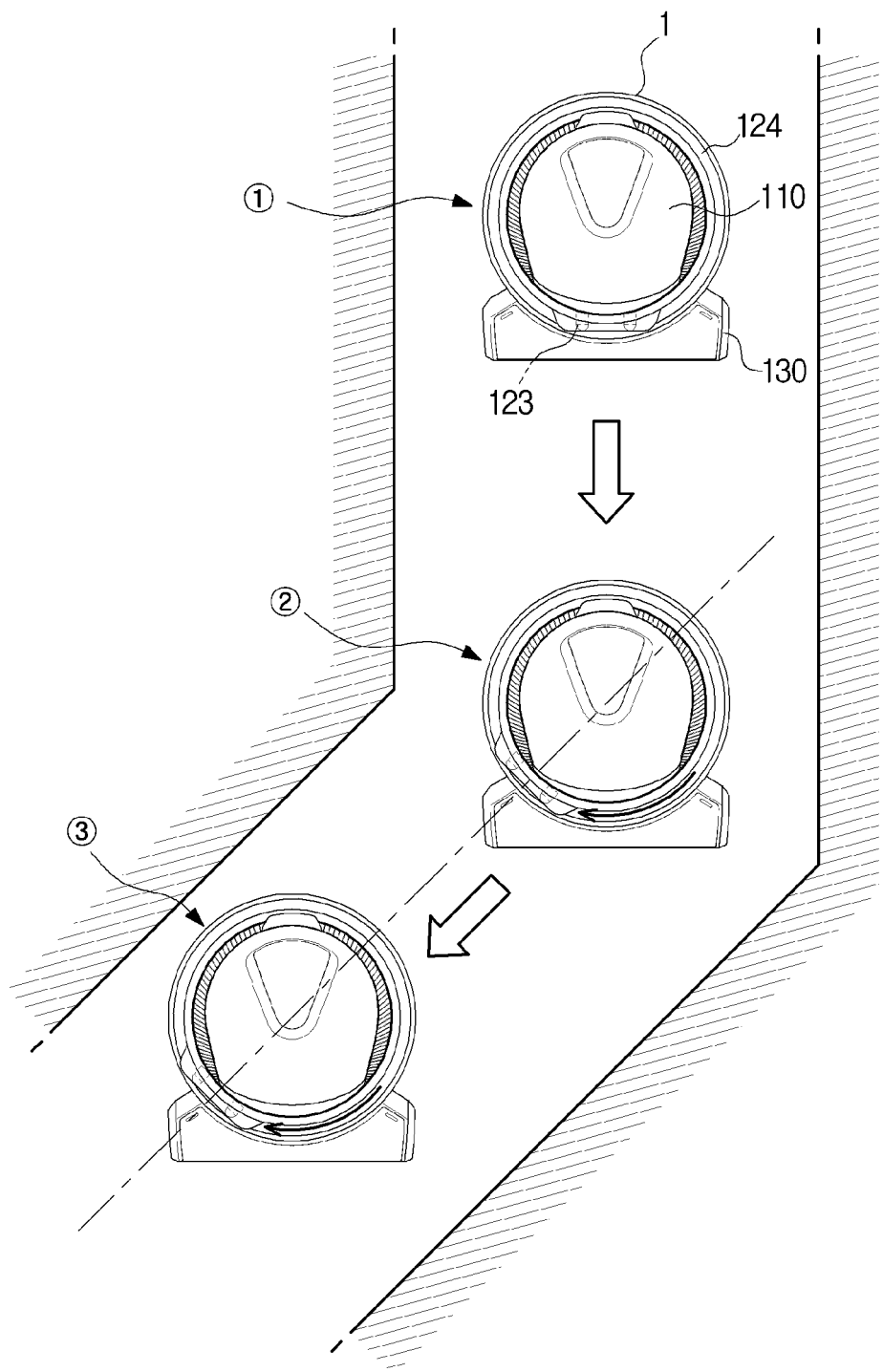
FIG. 5 is a view illustrating a sensor according to an embodiment of the present disclosure rotating according to a traveling route of a robot cleaner.
Figure 6:
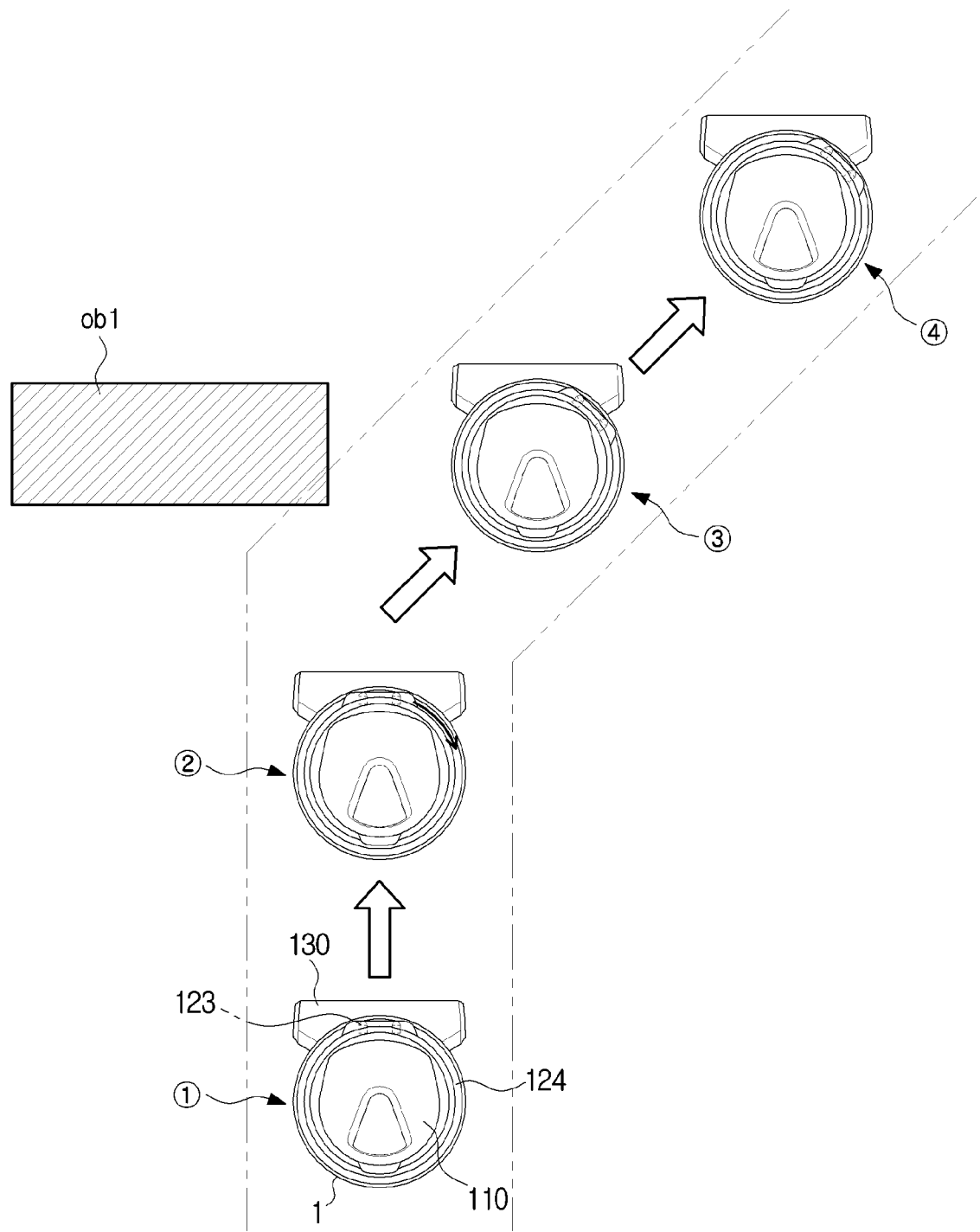
FIGS. 6 to 8 illustrate examples in which a robot cleaner according to an embodiment of the present disclosure travels while avoiding obstacles without rotating a body unit.
Figure 7:
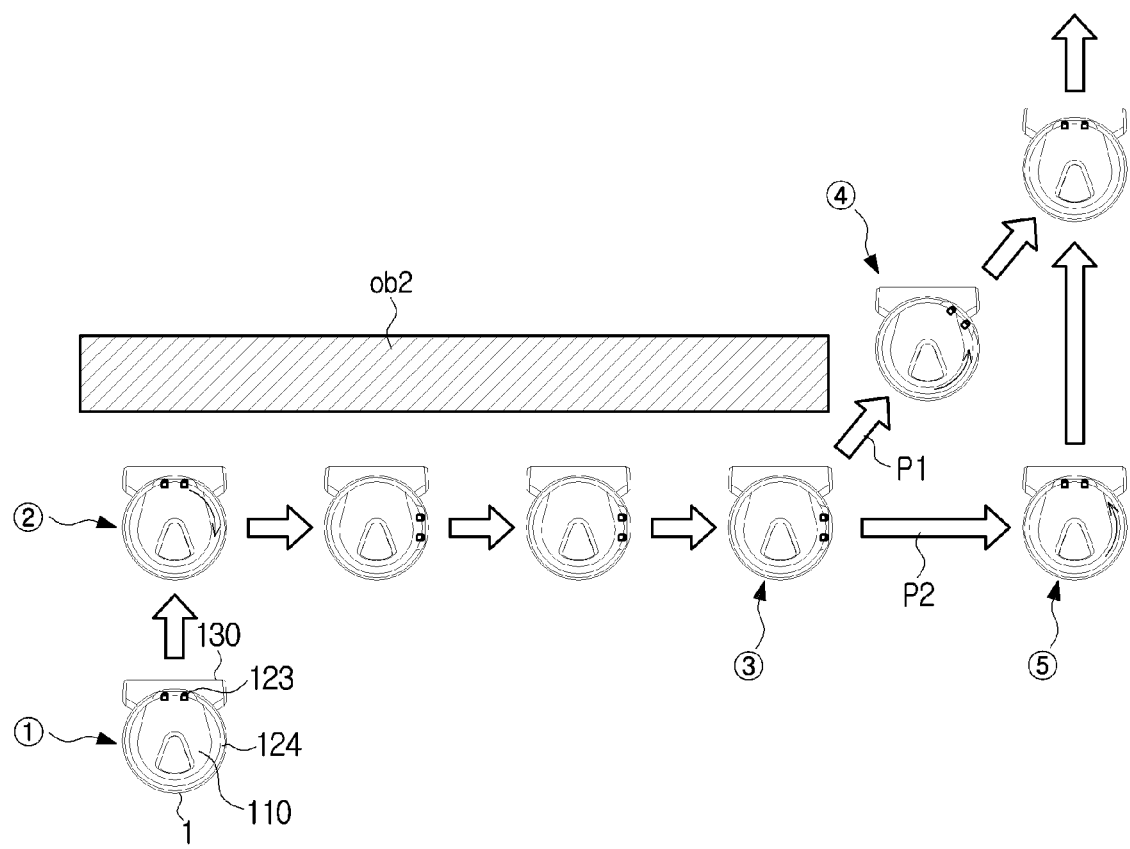
Figure 8:
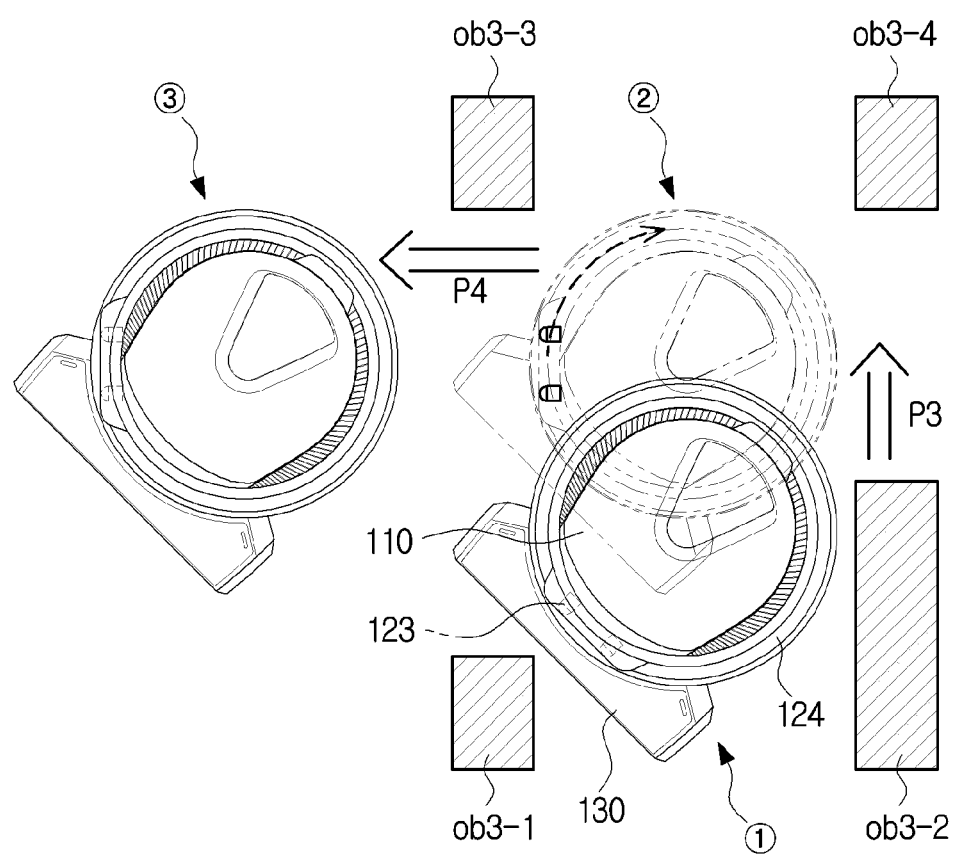
Figure 9:
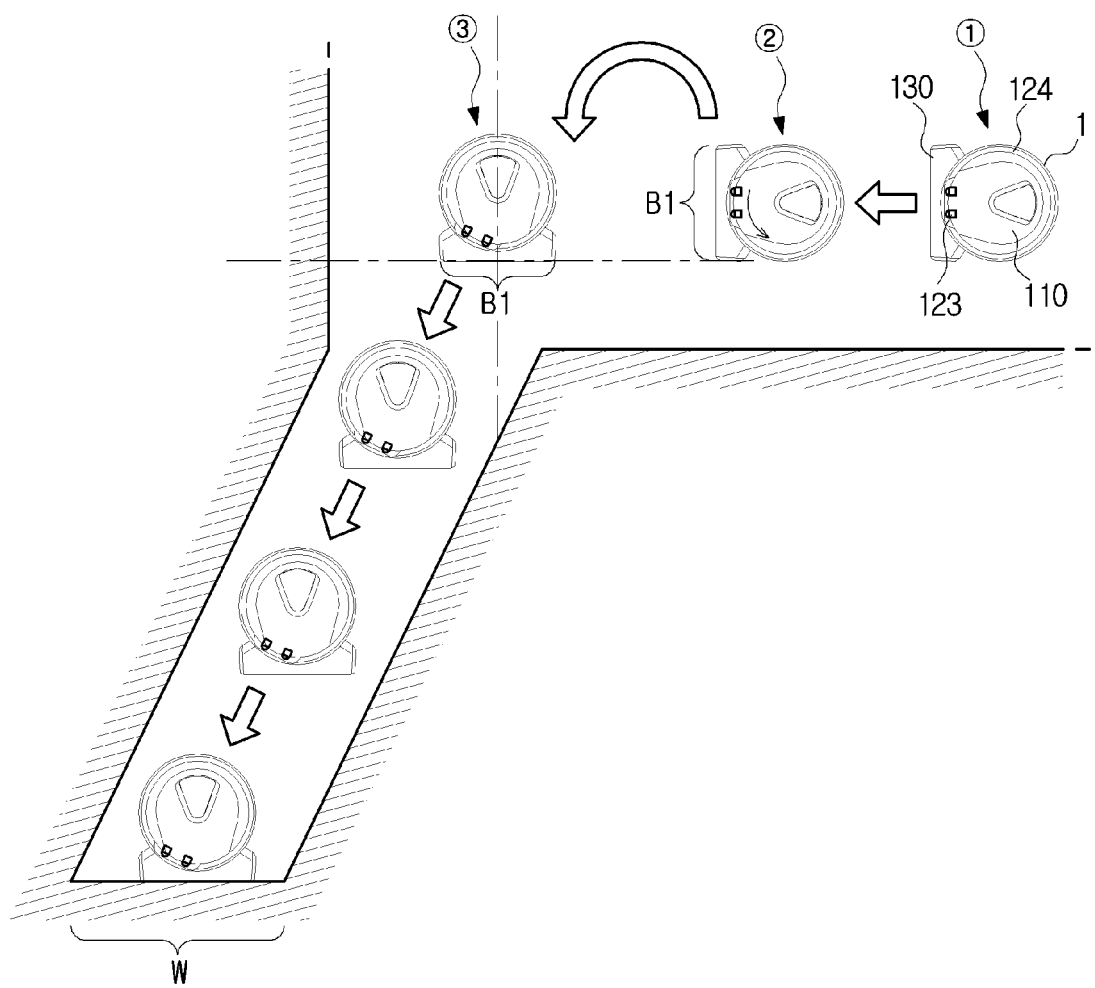
FIG. 9 illustrates a robot cleaner according to an embodiment of the present disclosure traveling in a direction of reaching a wall surface while sensing the wall surface.
Figure 10:
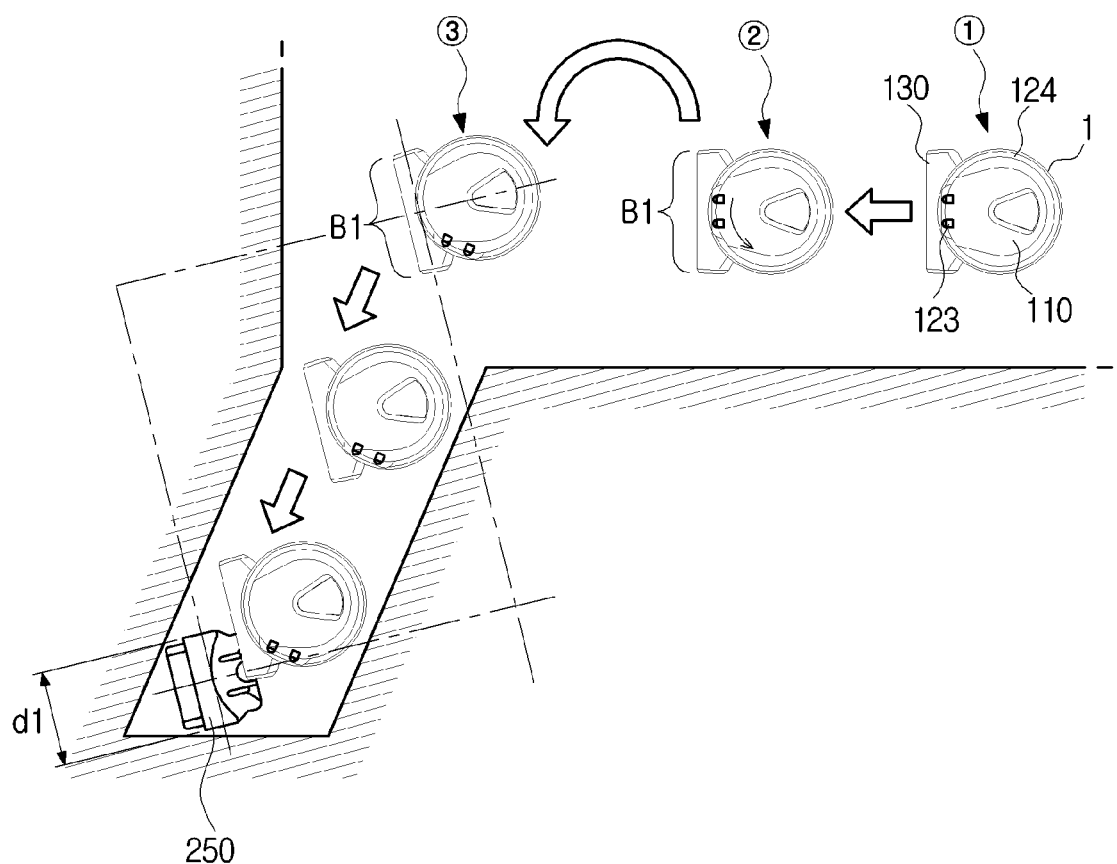
FIG. 10 illustrates a robot cleaner according to an embodiment of the present disclosure traveling in a direction of reaching a docking station while sensing the docking station.
Figure 11:
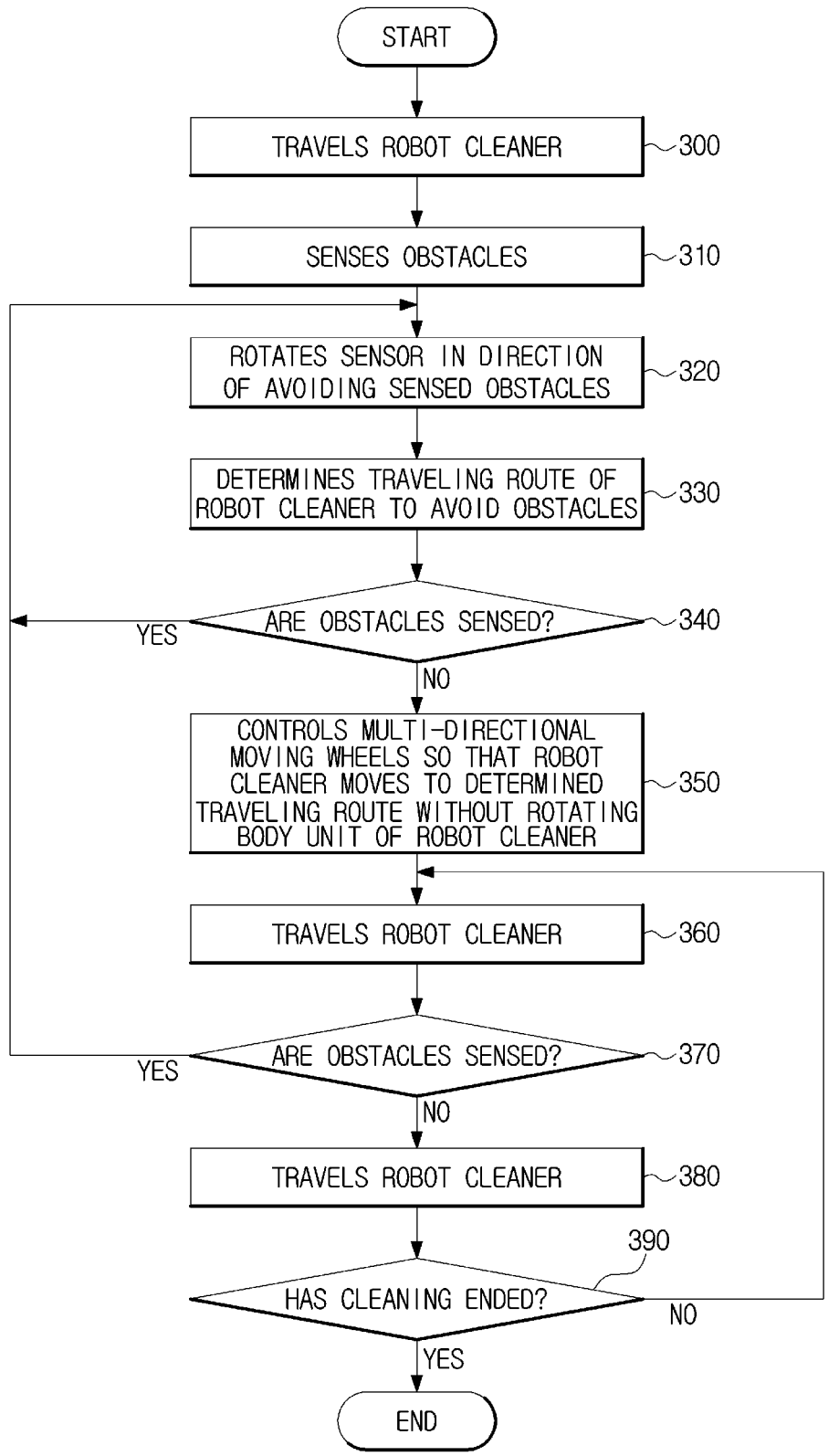
FIGS. 11 to 13 are flowcharts illustrating a traveling algorithm of a robot cleaner according to an embodiment of the present disclosure.
Figure 12:
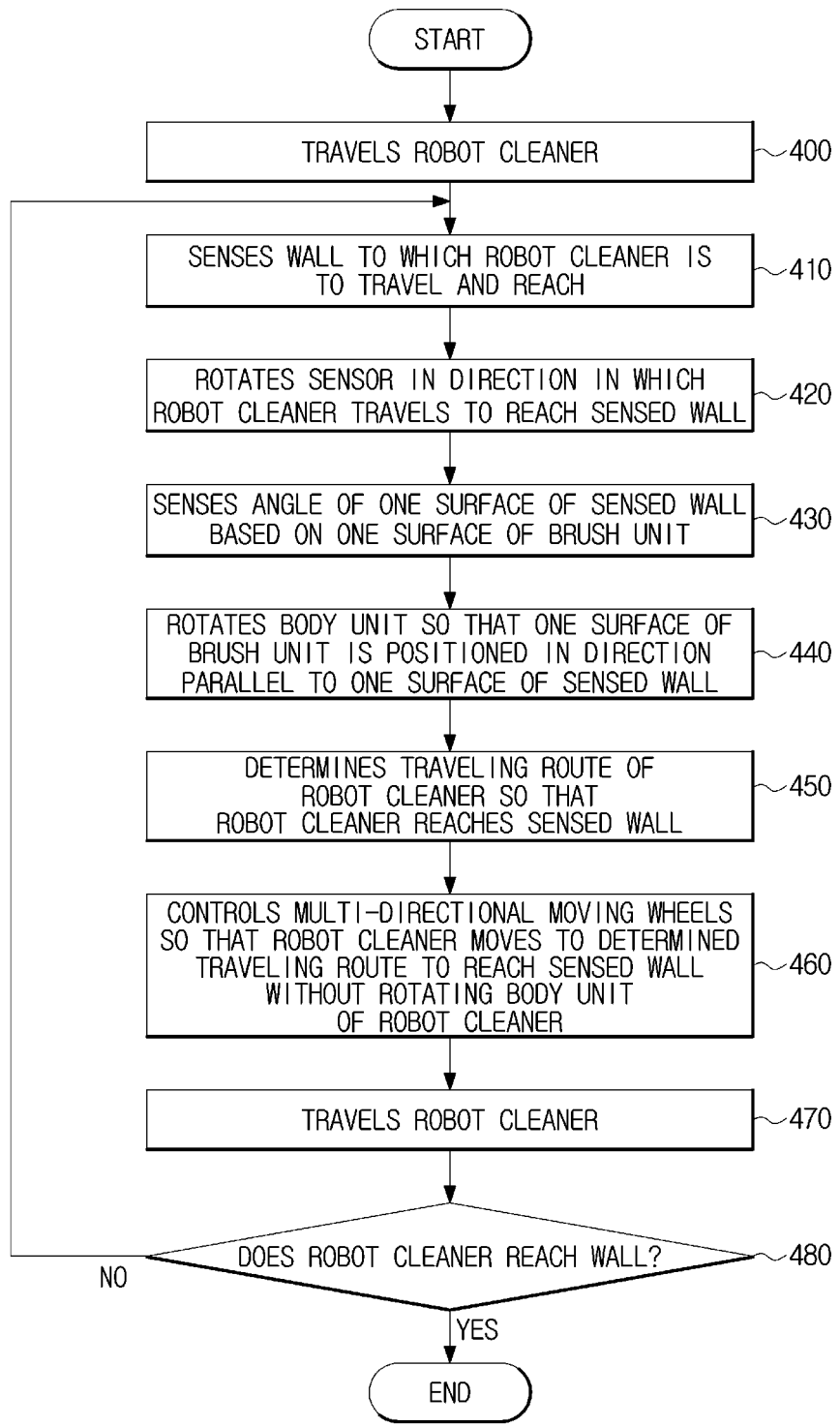
Figure 13:
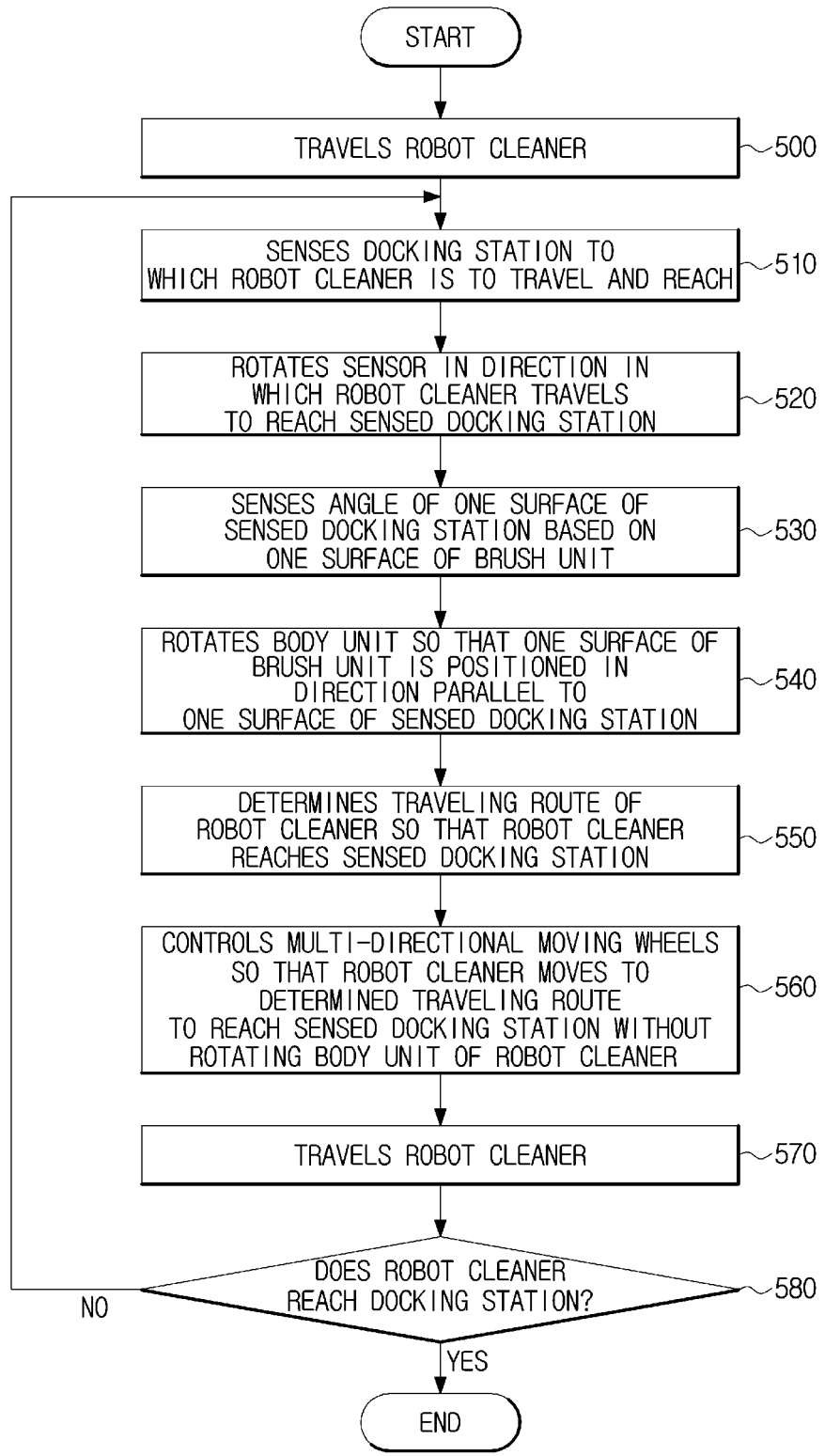
Figure 14:
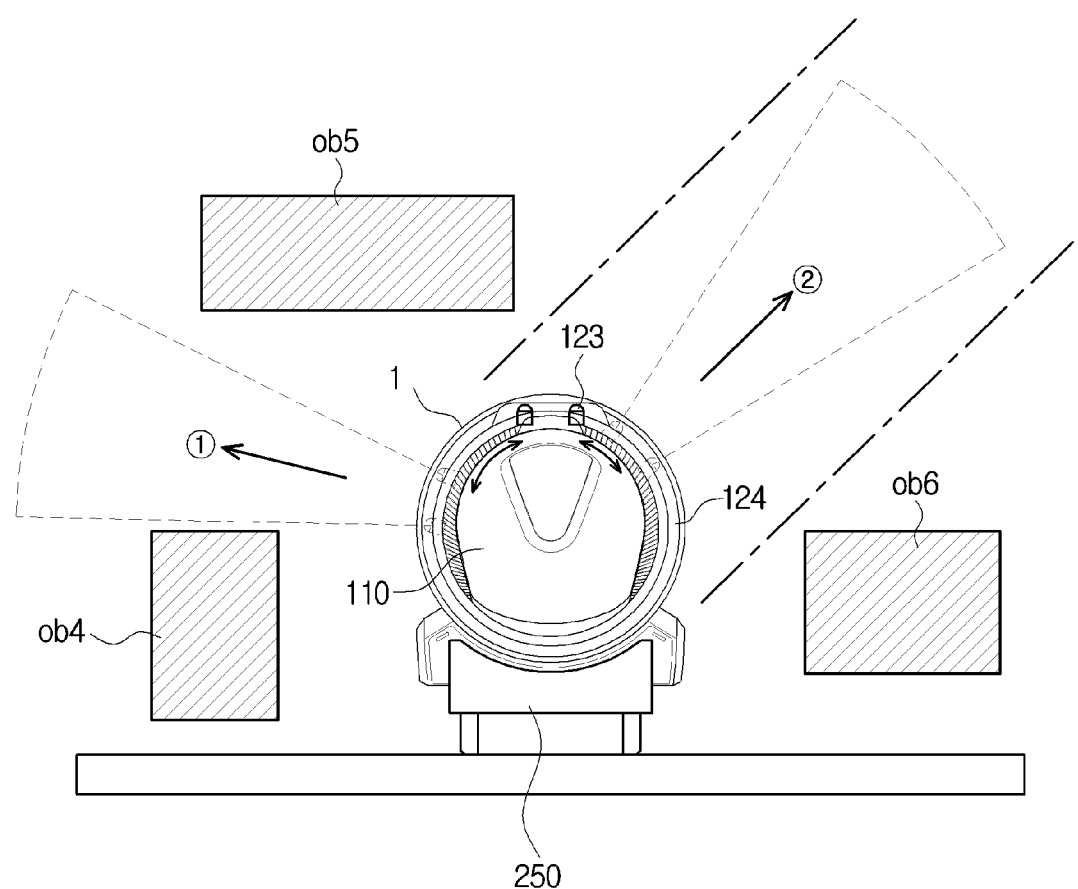
FIG. 14 is a conceptual view illustrating a robot cleaner according to an embodiment of the present disclosure sensing obstacles around the robot cleaner while being coupled to a docking station.

FIG. 5 is a view illustrating a sensor according to an embodiment of the present disclosure rotating according to a traveling route of a robot cleaner, and FIGS. 6 to 8 illustrate examples in which a robot cleaner according to an embodiment of the present disclosure travels while avoiding obstacles without rotating a body unit. FIG. 9 illustrates a robot cleaner according to an embodiment of the present disclosure traveling in a direction of reaching a wall surface while sensing the wall surface, and FIG. 10 illustrates a robot cleaner according to an embodiment of the present disclosure traveling in a direction of reaching a docking station while sensing the docking station. FIGS. 11 to 13 are flowcharts illustrating a traveling algorithm of a robot cleaner according to an embodiment of the present disclosure, and FIG. 14 is a conceptual view illustrating a robot cleaner according to an embodiment of the present disclosure sensing obstacles around the robot cleaner while being coupled to a docking station.

Referring to FIG. 5, the traveling route may be changed while the robot cleaner 1 is traveling, and the sensor 123 may be rotated toward the traveling route that is to be changed. That is, when the robot cleaner 1 travels from position (1) and reaches position (2), the sensor 123 may search for the traveling route of the robot cleaner 1, and the sensor rotation module 124 may be rotated toward the traveling route under the control of the controller 100.

As shown in FIG. 5, at position (2), the body unit 110 of the robot cleaner 1 is in a fixed state without rotating, and the sensor 123 may rotate in the forward right diagonal direction based on the rotation of the sensor rotation module 124. At this time, the sensor 123 may be rotated clockwise according to the rotation of the sensor rotation module 124, and may also be rotated by an angle at which the traveling route of the robot cleaner 1 is changed.

The controller 100 may determine the traveling route of the robot cleaner 1 based on the rotational direction of the sensor 123. That is, the sensor 123 senses the traveling route of the robot cleaner 1 and may rotate clockwise, and when the sensor 123 rotates to a particular angle with respect to the existing traveling direction and then stops, the controller 100 may determine the traveling route of the robot cleaner 1 based on the rotation direction and the rotation angle of the sensor 123.

When the traveling route of the robot cleaner 1 is determined, the controller 100 may control the multi-directional moving wheels 113 so that the robot cleaner 1 moves to the determined traveling route in a state where the body unit 110 is not rotated.

That is, as shown in FIG. 5, the direction in which the body unit 110 is heading at position (2) before the traveling route of the robot cleaner 1 is changed and the direction in which the body unit 110 is heading at position (3) after the traveling route of the robot cleaner 1 is changed are the same. The controller 100 controls the driving device 112 so that the front right multi-directional moving wheel 113a and the rear left multi-directional moving wheel 113d provided diagonally thereto are not driven and the front left multi-directional moving wheel 113b and the rear right multi-directional moving wheel 113c provided diagonally thereto is driven in the forward direction. According to the above driving, the robot cleaner 1 may travel in the front rightward diagonal direction.

Referring to FIGS. 6 and 11, while the robot cleaner 1 starts traveling from position (1) and travels in a cleaning space (operation 300), the sensor 123 may sense an obstacle ob1 (operation 310) and transmit data on the sensed obstacle ob1 to the controller 100.

When the robot cleaner 1 reaches position (2), the robot cleaner 1 comes face to face with the obstacle ob1 and is no longer able to travel, and thus must travel to avoid the obstacle ob1.

As described above with reference to FIG. 5, the sensor 123 may rotates in a direction of avoiding the sensed obstacle ob1 (operation 320) so that the robot cleaner 1 may travel to avoid the obstacle ob1. That is, when the robot cleaner 1 reaches position (2), the sensor 123 may sense a traveling route that causes the robot cleaner 1 to avoid the obstacle ob1, and may be rotated in the traveling route direction of avoiding the obstacle ob1 according to the rotation of the sensor rotation module 124.

As shown in FIG. 6, at position (2), the body unit 110 of the robot cleaner 1 is in a fixed state without rotating, and the sensor 123 may rotate in the forward right diagonal direction based on the rotation of the sensor rotation module 124. At this time, the sensor 123 may be rotated clockwise according to the rotation of the sensor rotation module 124, and may also be rotated by an angle at which the traveling route of the robot cleaner 1 is changed.

The controller 100 may determine a traveling route in which the robot cleaner 1 may avoid the obstacle ob1 based on the rotational direction of the sensor 123 (operation 330). That is, the sensor 123 may be rotated in the clockwise direction by sensing a traveling route so that the robot cleaner 1 avoids the obstacle ob1, and when the sensor 123 stops after rotating by a particular angle with respect to the existing traveling direction, the controller 100 may determine a traveling route that causes the robot cleaner 1 to avoid the obstacle ob1 based on the rotational direction and the rotational angle of the sensor 123.

When the controller 100 determines the traveling route of the robot cleaner 1, the sensor 123 may sense whether there are other obstacles located on the determined traveling route (operation 340).

When the traveling route of the robot cleaner 1 is determined, the controller 100 may control the multi-directional moving wheels 113 to move the robot cleaner 1 to the determined traveling route without rotating the body unit 110 (operation 350).

As in the case of FIG. 5, the controller 100 controls the driving device 112 so that the front right multi-directional moving wheel 113a and the rear left multi-directional moving wheel 113d provided diagonally thereto are not driven and the front left multi-directional moving wheel 113b and the rear right multi-directional moving wheel 113c provided diagonally thereto is driven in the forward direction. According to the above driving, the robot cleaner 1 may travel in the forward right diagonal direction to avoid the obstacle ob1.

In this case, as shown in FIG. 6, the direction in which the body unit 110 is heading at position (2) before the traveling route of the robot cleaner 1 is changed and the direction in which the body unit 110 is heading at position (3) to position (4) after the traveling route of the robot cleaner 1 is changed are the same, and the positions of the sensor 123 at position (2) and position (3) are different.

When the robot cleaner 1 travels while avoiding the obstacle ob1 (operation 360), the sensor 123 may sense an obstacle located on the traveling route of the robot cleaner 1 in real time (operation 370), and if there are no obstacles as a result of the sensing, the robot cleaner 1 may continue traveling (operation 380). In addition, the controller 100 may determine whether cleaning of the cleaning space of the robot cleaner 1 has ended (operation 390).

Referring to FIG. 7, while the robot cleaner 1 starts traveling from position (1) and travels in the cleaning space (operation 300), the sensor 123 may sense an obstacle ob2 (operation 310) and may transmit the data of the sensed obstacle ob2 to the controller 100.

Also in this case, when the robot cleaner 1 reaches position (2), the robot cleaner 1 comes face to face with the obstacle ob2 and is no longer able to travel, and thus must travel to avoid the obstacle ob2.

As described above with reference to FIG. 6, the sensor 123 may be rotated (operation 320) in a direction of avoiding the sensed obstacle ob2 so that the robot cleaner 1 may travel while avoiding the obstacle ob2. That is, when the robot cleaner 1 reaches position (2), the sensor 123 may sense a traveling route that causes the robot cleaner 1 to avoid the obstacle ob2, and may be rotated in the traveling route direction avoiding the obstacle ob2 in accordance with the rotation of the sensor rotation module 124.

As shown in FIG. 7, at position (2), the body unit 110 of the robot cleaner 1 is in a fixed state without rotating, and the sensor 123 may be rotated by 90° in the clockwise direction based on the rotation of the sensor rotation module 124.

When the traveling route of the robot cleaner 1 is determined, the controller 100 may control the multi-directional moving wheels 113 (operation 350) to move the robot cleaner 1 to the determined traveling route in a state where the body unit 110 is not rotated.

The controller 100 controls the driving device 112 to drive the front left multi-directional moving wheel 113b and the rear right multi-directional moving wheel 113c provided diagonally thereto in the diagonal forward direction and drive the front right multi-directional moving wheel 113a and the rear left multi-directional moving wheel 113d provided diagonally thereto in the diagonal rearward direction. According to the above driving, the robot cleaner 1 may travel in the rightward direction while avoiding the obstacle ob2.

In this case, as shown in FIG. 7, the direction in which the body unit 110 is heading at position (2) before the traveling route of the robot cleaner 1 is changed and the direction in which the body unit 110 is heading at position (3) where the robot cleaner 1 travels in the rightward direction after changing the traveling route and reaches are the same, and the positions of the sensor 123 at position (2) and position (3) are different.

When the robot cleaner 1 travels and reaches position (3), the controller 100 may determine various traveling routes to travel while avoiding the obstacle ob2.

As shown in FIG. 7, the sensor 123 may be rotated in the front right diagonal direction based on the rotation of the sensor rotation module 124 in a state where the body unit 110 of the robot cleaner 1 is not rotated. At this time, the sensor 123 may be rotated counterclockwise according to the rotation of the sensor rotation module 124, and may also be rotated by an angle at which the traveling route of the robot cleaner 1 is changed.

The controller 100 may determine a traveling route P1 that allows the robot cleaner 1 to avoid the obstacle ob2 based on the rotational direction of the sensor 123. When the traveling route P1 of the robot cleaner 1 is determined, the controller 100 may control the multi-directional moving wheels 113 so that the robot cleaner 1 moves to the determined traveling route P1 in a state where the body unit 110 is not rotated.

The controller 100 controls the driving device 112 not to drive the front right multi-directional moving wheel 113a and the rear left multi-directional moving wheel 113d provided diagonally thereto, and to drive the front left multi-directional moving wheel 113b and the rear right multi-directional moving wheel 113c provided diagonally thereto in the forward direction. According to the above driving, the robot cleaner 1 may travel in the front rightward diagonal direction while avoiding the obstacle ob2.

As shown in FIG. 7, the direction in which the body unit 110 is heading at position (3) before the traveling route of the robot cleaner 1 is changed and the direction in which the body unit 110 is heading at position (4) after the traveling route of the robot cleaner 1 is changed are the same, and the positions of the sensor 123 at position (3) and position (4) are different.

On the other hand, the robot cleaner 1 may travel along a traveling route P2 in order to avoid the obstacle ob2 at position (3). When the robot cleaner 1 reaches position (5), the sensor 123 may be rotated counterclockwise according to the rotation of the sensor rotation module 124, and may also be rotated by an angle at which the traveling route of the robot cleaner 1 is changed.

That is, at position (5), the body unit 110 of the robot cleaner 1 is in a fixed state without rotating, and the sensor 123 may be rotated by 90° in the counterclockwise direction based on the rotation of the sensor rotation module 124.

The controller 100 may determine a route for causing the robot cleaner 1 to travel straight in the forward direction in which the body unit 110 is heading based on the rotational direction of the sensor 123.

The controller 100, when the traveling route of the robot cleaner 1 is determined, may control the multi-directional moving wheels 113 so that the robot cleaner 1 moves to the determined traveling route in a state where the body unit 110 is not rotated. That is, the controller 100 may control the driving device 112 to drive all of the four multi-directional moving wheels 113 in the forward direction, and according to the above driving, the robot cleaner 1 may travel straight in the forward direction from position (5).

The controller 100 may determine that the traveling route P1 or P2 is a route that the robot cleaner 1 may travel while avoiding the obstacle ob2, and when the traveling route is determined, may drive the multi-directional moving wheels 113 in a state where the body unit 110 of the robot cleaner 1 is not rotated so that the robot cleaner 1 travels to the determined traveling route.

As shown in FIG. 8, while the robot cleaner 1 is traveling in the cleaning space, the sensor 123 may sense a plurality of obstacles ob3 (ob3-1, ob3-2, ob3-3 and ob3-4), and may transmit data on the detected obstacles ob3 to the controller 100.

When the robot cleaner 1 is located at position (1), the robot cleaner 1 may not continue to travel in the traveling direction due to the obstacles ob3-1 and ob3-2 around the robot cleaner 1. Therefore, the robot cleaner 1 must avoid the obstacles ob3. The sensor 123 may sense the plurality of obstacles ob3-1, ob3-2, ob3-3, and ob3-4 located around the robot cleaner 1, and the controller 100 may determine a traveling route capable of avoiding the plurality of obstacles ob3-1, ob3-2, ob3-3, and ob3-4 in a state where the body unit 110 is not rotated, based on the location information of the sensed plurality of obstacles ob3-1, ob3-2, ob3-3, and ob3-4.

When the robot cleaner 1 is located at position (1), the sensor 123 may be rotated in a traveling route capable of avoiding the plurality of obstacles ob3-1, ob3-2, ob3-3, and ob3-4. That is, as shown in FIG. 8, the sensor 123 may be rotated in the clockwise direction and directed to the leftward direction (direction of a traveling route P4) of the robot cleaner 1.

The controller 100 may determine a route for causing the robot cleaner 1 to travel while avoiding the plurality of obstacles ob3-1, ob3-2, ob3-3, and ob3-4, based on the rotational direction of the sensor 123. That is, the controller 100 may determine a moving route of the robot cleaner 1 based on the location information of the plurality of obstacles ob3-1, ob3-2, ob3-3, and ob3-4.

When the traveling route of the robot cleaner 1 is determined, the controller 100 may control the multi-directional moving wheels 113 to move the robot cleaner 1 to the determined the traveling route in a state where the body unit 110 is not rotated.

The controller 100 may control the multi-directional moving wheels 113 through the driving device 112, so that the robot cleaner 1 reaches position (2) by moving in the direction of a traveling route P3 from position (1), and then reaches position (3) by moving in the direction of the traveling route P4 from position (2), thereby avoiding the plurality of obstacles ob3-1, ob3-2, ob3-3, and ob3-4.

At this time, while the robot cleaner 1 travels to position (3) via position (2) from position (1), the main body unit 110 is directed to the same direction. That is, the controller 100 may control the robot cleaner 1 to avoid the plurality of obstacles ob3-1, ob3-2, ob3-3, and ob3-4 through the control of the multi-directional moving wheels 113 without the rotation of the body unit 110, based on the location information of the plurality of obstacles ob3-1, ob3-2, ob3-3, and ob3-4 sensed by the sensor 123.

Referring to FIGS. 9 and 12, while the robot cleaner 1 travels in the cleaning space (operation 400), the sensor 123 may sense a target object to which the robot cleaner 1 is to travel and reach. The target object sensed by the sensor 123 may include a wall that the robot cleaner 1 follows to perform cleaning or a docking station 250 (refer to FIG. 10) for charging a battery of the robot cleaner 1.

In this embodiment, a case where the target object sensed by the sensor 123 is a wall will be described with reference to FIG. 9.

While the robot cleaner 1 starts traveling from position (1) and travels in the cleaning space, the sensor 123 may sense a wall W for the robot cleaner 1 to reach and perform cleaning (operation 410).

When the sensor 123 senses the wall W, the controller 100 may rotate the sensor 123 in the traveling direction for the robot cleaner 1 to reach the wall W sensed by the sensor 123 (operation 420). That is, the sensor 123 may sense the wall W to which the robot cleaner 1 is to reach at position (2) during traveling of the robot cleaner 1, and may rotate in the counterclockwise direction through the sensor rotation module 124 so that the robot cleaner 1 may be directed to the direction in which the robot cleaner 1 travels toward the wall W.

The sensor 123 may sense the angle of the wall W sensed based on one surface B1 of the brush unit 130 (operation 430). The controller 100 may rotate the body unit 110 by controlling the multi-directional moving wheels 113 so that the one surface B1 of the brush unit 130 is positioned in a direction parallel to one surface of the wall W based on the angle of the wall W sensed by the sensor 123 (operation 440).

As shown in FIG. 9, the robot cleaner 1 may rotate the body unit 110 at position (2) so that the one surface B1 of the brush unit 130 is positioned in a direction parallel to the one surface of the wall W as in position (3).

The controller 100 may determine a traveling route of the robot cleaner 1 so that the robot cleaner 1 reaches the wall W based on the rotational direction of the sensor 123 (operation 450). Because the one surface B1 of the brush unit 130 of the robot cleaner 1 is positioned in the direction parallel to the one surface of the wall W at position (3), the controller 100 may control the multi-directional moving wheels 113 to move the robot cleaner 1 along the determined traveling route.

That is, the controller 100 may move the robot cleaner 1 to the determined traveling route through the control of the multi-directional moving wheels 113 to reach the wall W without rotating the body unit 110 of the robot cleaner 1 (operation 460).

As described above with reference to FIG. 3, the controller 100 may control the multi-directional moving wheels 113 to cause the robot cleaner 1 to travel in the front rightward diagonal direction along the traveling route to which the sensor 123 is directed. The robot cleaner 1 may travel in a diagonal direction by the multi-directional moving wheels 113 while reaching the wall W along the determined traveling route, and may travel without rotating the body unit 110 (operation 470).

The controller 100 may determine whether the robot cleaner 1 has reached the wall W (operation 480), and may control the robot cleaner 1 to perform cleaning when reaching the wall W as a result of the determination.

Referring to FIGS. 10 and 13, the sensor 123 may sense the docking station 250 to charge the battery of the robot cleaner 1 while the robot cleaner 1 travels in the cleaning space (operation 500). The robot cleaner 1 may receive a docking signal or a docking induction signal transmitted from the docking station 250, and move to a docking position of the docking station 250 and dock in the docking station 250 in accordance with the received docking signal.

While the robot cleaner 1 starts traveling from position (1) and travels in the cleaning space (operation 500), the sensor 123 may sense the docking station 250 where the robot cleaner 1 reaches and docks (operation 510).

When the sensor 123 senses the docking station 250, the controller 100 may rotate the sensor 123 in the traveling direction for the robot cleaner 1 to reach the docking station 250 sensed by the sensor 123 (operation 520). That is, the sensor 123 may sense the docking station 250 to which the robot cleaner 1 is to reach at position (2) during traveling of the robot cleaner 1, and may be rotated in the counterclockwise direction through the sensor rotation module 124 so that the robot cleaner 1 may be directed to the direction of traveling toward the docking station 250.

The sensor 123 may also sense the angle of one surface dl of the sensed docking station 250, based on the one surface B1 of the brush unit 130. The controller 100 may control the multi-directional moving wheels 113 to rotate the body unit 110 (operation 540) so that the one surface B1 of the brush unit 130 is positioned in a direction parallel to the one surface dl of the docking station 250 based on the angle of the one surface dl of the docking station 250 detected by the sensor 123.

As shown in FIG. 10, the robot cleaner 1 may rotate the body unit 110 at position (2) so that the one surface B1 of the brush unit 130 is positioned in the direction parallel to the one surface dl of the docking station 250 as in position (3).

The controller 100 may determine the traveling route of the robot cleaner 1 so that the robot cleaner 1 reaches the docking station 250 based on the rotational direction of the sensor 123 (operation 550). Because the one surface B1 of the brush unit 130 of the robot cleaner 1 is positioned in the direction parallel to the one surface dl of the docking station 250 at position (3), the controller 100 may control the multi-directional moving wheels 113 to move the robot cleaner 1 along the determined traveling route.

That is, the controller 100 may move the robot cleaner 1 to the determined traveling route through the control of the multi-directional moving wheels 113 to reach the docking station 250 without rotating the body unit 110 of the robot cleaner 1 (operation 560).

As described above with reference to FIG. 3, the controller 100 may control the multi-directional moving wheels 113 to cause the robot cleaner 1 to travel in the front rightward diagonal direction along the traveling route to which the sensor 123 is directed. The robot cleaner 1 may travel in a diagonal direction by the multi-directional moving wheels 113 while reaching the docking station 250 along the determined traveling route, and may travel without further rotating the body unit 110 (operation 570).

The controller 100 may determine whether the robot cleaner 1 has reached the docking station 250 (operation 580), and may control the robot cleaner 1 to dock the docking station 250 and charge the battery when reaching the docking station 250 as a result of the determination.

Referring to FIG. 14, when the robot cleaner 1 docks to the docking station 250 to charge the battery, the sensor 123 provided in the robot cleaner 1 may sense obstacles around the robot cleaner 1.

That is, when the sensor 123 is rotated through the sensor rotation module 124 to sense obstacles located in the vicinity of the robot cleaner 1, the controller 100 may transmit the obstacle sensing result of the sensor 123 to the user terminal 200 through the communicator 140.

As shown in FIG. 14, the sensor rotation module 124 rotates clockwise or counterclockwise in a state where the robot cleaner 1 is docked to the docking station 250 so that the sensor 123 provided in the sensor rotation module 124 may sense the obstacles ob4, ob5, and ob6 located in the vicinity of the robot cleaner 1.

That is, when the sensor 123 senses the obstacles ob4 and ob5 and transmits the position information of the obstacles ob4 and ob5 to the controller 100, the controller 100 may determine that the robot cleaner 1 may not travel on the route toward position (1) after the charging is completed and the robot cleaner 1 is separated from the docking station 250.

Also, when the sensor 123 senses the obstacles ob5 and ob6 and transmits the position information of the obstacles ob5 and ob6 to the controller 100, the controller 100 may determine whether the robot cleaner 1 may travel on the route toward position (2) after the charging is completed and the robot cleaner 1 is separated from the docking station 250.

That is, the controller 100 may determine a traveling route in which the robot cleaner 1 may avoid the obstacles ob5 and ob6 and may travel on the route toward position (2) in a state where the body unit 110 of the robot cleaner 1 is not rotated, based on the position information of the obstacles ob5 and ob6 sensed by the rotation of the sensor 123 and the rotational direction of the sensor 123.

On the other hand, as a result of sensing an obstacle located in the vicinity of the robot cleaner 1 by the sensor 123 and transmitting it to the controller 100, when the controller 100 determines that a route for avoiding the obstacle sensed after completion of charging the robot cleaner 1 may not be secured, the controller 100 may transmit a warning signal to the user terminal 200 through the communicator 140.

The controller 100 may transmit a warning signal, which indicates that the traveling route of the robot cleaner 1 may not be secured after charging of the robot cleaner 1 is completed because an obstacle is located around the robot cleaner 1 currently docked to the docking station 250 and being charged, to the user terminal 200. The user may confirm the current driving state or a driving-impossibility state of the robot cleaner 1 by sound or message through the user terminal 200.

Herein, the disclosed embodiments may be implemented in the form of a recording medium storing instructions executable by a computer. The instructions may be stored in the form of program code and, when executed by a processor, a program module may be created to perform the operations of the disclosed embodiments. The recording medium may be implemented as a computer-readable recording medium.

The computer-readable recording medium includes various kinds of recording media in which instructions which can be decrypted by a computer are stored. For example, there may be a ROM (Read Only Memory), a RAM (Random Access Memory), a magnetic tape, a magnetic disk, a flash memory, an optical data storage device, and the like.

As is apparent from the above, the robot cleaner according to an embodiment of the present disclosure can ensure effective driving performance by sensing obstacles located in the vicinity of the robot cleaner through a rotatable sensor. Further, the robot cleaner according to an embodiment of the present disclosure can improve the obstacle avoidance ability and improve the freedom of movement even in a narrow area by traveling in various directions without rotating the body of the robot cleaner through wheels capable of moving in all directions.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A robot cleaner comprising:
a body;
a brush including a flat surface and coupled to an outer circumferential surface of the body;
a sensor provided to be rotatable relative to the body, and configured to sense at least one obstacle, a target object to which the robot cleaner is to reach, and a surface of the sensed target object;
a multi-directional moving wheel provided to move the body in various directions independently from a rotational position of the body; and
a controller configured to:
determine an angle of the sensed surface of the sensed target object relative to the flat surface of the brush,
determine a traveling route of the robot cleaner to avoid the sensed at least one obstacle,
control the multi-directional moving wheel to rotate the body so that the flat surface of the brush is positioned in a direction parallel to the surface of the sensed target object based on the determined angle of the sensed surface of the sensed target object, and
control the multi-directional moving wheel to move the robot cleaner along the determined traveling route toward the sensed target object after the body is rotated,
wherein the body including the flat surface of the brush is maintained in a fixed rotational position relative to the sensed surface of the sensed target object while the robot cleaner moves along the determined traveling route.

2. The robot cleaner according to claim 1, further comprising:
a sensor rotation assembly rotatably coupled to the body, wherein the sensor is provided on the sensor rotation assembly.

3. The robot cleaner according to claim 1, wherein:
the sensor is configured to rotate to a rotational direction to face a direction of travel to avoid the sensed at least one obstacle, and the controller is further configured to determine the traveling route of the robot cleaner based on the rotational direction of the sensor.

4. The robot cleaner according to claim 1, wherein:
the controller is further configured to determine the traveling route based on position information of the sensed at least one obstacle.

5. The robot cleaner according to claim 1, wherein:
the sensor is further configured to sense the target object including a wall and a docking station for charging a battery of the robot cleaner.

6. The robot cleaner according to claim 5, wherein:
the sensor is configured to rotate in a direction toward the sensed target object, and
the controller is further configured to determine the traveling route of the robot cleaner based on the rotational direction of the sensor.

7. The robot cleaner according to claim 6, wherein:
the controller is further configured to control the multi-directional moving wheel to move the robot cleaner along the determined traveling route to reach the sensed target object while the body is maintained in a same rotational position as that prior to the determining of the traveling route.

8. The robot cleaner according to claim 1, wherein:
the multi-directional moving wheel is configured to move the body in multiple directions including forward, backward, left, right, and diagonal directions, and configured to rotate the body in place.

9. The robot cleaner according to claim 1, wherein:
the multi-directional moving wheel includes a plurality of independently controllable multi-directional moving wheels.

10. A control method of a robot cleaner having a mutt directional moving wheel provided to move a body of the robot cleaner in various directions independently of a rotational position of the body, a brush including a flat surface and coupled to an outer circumferential surface of the body, and a sensor provided to be rotatable relative to the body, the control method comprising:
performing, by at least one processor of the robot cleaner, operations including:
sensing at least one obstacle, a target object to which the robot cleaner is to reach, and a surface of the sensed target object using the sensor;
determining an angle of the sensed surface of the sensed target object relative to the flat surface of the brush;
determining a traveling route of the robot cleaner to avoid the sensed at least one obstacle;
controlling the multi-directional moving wheel to rotate the body so that the flat surface of the brush is positioned in a direction parallel to the surface of the sensed target object based on the determined angle of the sensed surface of the sensed target object; and
controlling the multi-directional moving wheel of the robot cleaner to move the robot cleaner along the determined traveling route toward the sensed target object after the body is rotated,
wherein the body of the robot cleaner including the flat surface of the brush is maintained in a fixed rotational position relative to the sensed surface of the sensed target object while the robot cleaner moves along the determined traveling route.

11. The control method according to claim 10, the operations further comprising:
controlling the sensor of the robot cleaner to rotate to a rotational direction to face a direction of travel to avoid the sensed at least one obstacle,
wherein the traveling route of the robot cleaner is determined based on the rotational direction of the sensor.

12. The control method according to claim 10, wherein:
the determining of the traveling route of the robot cleaner further includes determining the traveling route based on location information of the sensed at least one obstacle.

13. The control method according to claim 10, the operations further comprising:
sensing a target object including a wall and a docking station for charging a battery of the robot cleaner.

14. The control method according to claim 13, the operations further comprising:
controlling the sensor to rotate in a direction toward the sensed target object,
wherein a traveling route of the robot cleaner is determined based on the rotational direction of the sensor.

15. The control method according to claim 14, wherein:
the controlling of the multi-directional moving wheel of the robot cleaner includes controlling the multi-directional moving wheel to move the robot cleaner along the determined traveling route to reach the sensed target object while the body is maintained in a same rotational position as that prior to the determining of the traveling route.

\* \* \* \* \*

UNITED STATES PATENT AND TRADEMARK OFFICE
CERTIFICATE OF CORRECTION

PATENT NO. : 11,064,858 B2  
APPLICATION NO. : 16/185469  
DATED : July 20, 2021  
INVENTOR(S) : Sang Sik Yoon Page 1 of 1

It is certified that error appears in the above-identified patent and that said Letters Patent is hereby corrected as shown below:

In the Claims

Column 19, Line 34 (approx.), In Claim 10, delete "mutt" and insert -- multi- --, therefor.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*